United States Patent
Goel et al.

(10) Patent No.: US 11,307,871 B2
(45) Date of Patent: Apr. 19, 2022

(54) SYSTEMS AND METHODS FOR MONITORING AND VALIDATING SERVER CONFIGURATIONS

(71) Applicant: Dell Products, L.P., Round Rock, TX (US)

(72) Inventors: Naman Goel, Bangalore (IN); Ravikanth Chaganti, Bangalore (IN); Ravishankar Kanakapura N, Bangalore (IN); Harsha Naik, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 242 days.

(21) Appl. No.: 16/695,124

(22) Filed: Nov. 25, 2019

(65) Prior Publication Data
US 2021/0157609 A1 May 27, 2021

(51) Int. Cl.
G06F 9/44 (2018.01)
G06F 9/445 (2018.01)
G06F 8/65 (2018.01)

(52) U.S. Cl.
CPC ............ G06F 9/44505 (2013.01); G06F 8/65 (2013.01)

(58) Field of Classification Search
CPC ................................ G06F 9/44505; G06F 8/65
See application file for complete search history.

(56) References Cited

U.S. PATENT DOCUMENTS

| | | | | |
|---|---|---|---|---|
| 7,600,294 B2* | 10/2009 | Hartman | ............. | B60B 33/0002 16/29 |
| 10,452,377 B2* | 10/2019 | Musani | ..................... | G06F 8/65 |
| 2008/0200256 A1* | 8/2008 | Gagner | ................. | G07F 17/323 463/42 |
| 2010/0191952 A1* | 7/2010 | Keinan | .................. | G06Q 10/06 713/100 |
| 2013/0055247 A1* | 2/2013 | Hiltgen | ............... | G06F 9/45558 718/1 |
| 2014/0143605 A1* | 5/2014 | Balla | .................... | G06F 9/44505 714/38.1 |
| 2016/0188318 A1* | 6/2016 | Li | ........................... | H04L 67/34 717/169 |
| 2016/0378454 A1* | 12/2016 | Nekrestyanov | ........... | G06F 8/65 717/170 |
| 2019/0334765 A1* | 10/2019 | Jain | ..................... | H04L 41/0873 |

* cited by examiner

Primary Examiner — Zahid Choudhury
(74) Attorney, Agent, or Firm — Fogarty LLP

(57) ABSTRACT

Method and systems support configuring components of a chassis comprising a plurality of IHSs (Information Handling Systems). A management controller of the chassis initiates a process for identifying a plurality of hardware and software capabilities of the chassis. Based on the identified capabilities, computing solutions, such as specialized computation and storage functions, supported by the chassis are determined. The computing solutions supported by the capabilities of the chassis are encoded, such as within a set of compatibility bits. Upon detecting updates to the hardware and software capabilities of the chassis, the encoded compatibility bits are used to determine compatibility of the updated capabilities with computing solutions supported by the chassis. The encoded solution compatibility information is transmitted to a solution manager that monitors compliance of multiple chassis within a datacenter and identifies chassis that are compatible with a particular computing solution without querying the individual chassis.

20 Claims, 4 Drawing Sheets

SYSTEMS AND METHODS FOR MONITORING AND VALIDATING SERVER CONFIGURATIONS

FIELD

The present disclosure generally relates to Information Handling Systems (IHSs), and, more particularly, to the configuration of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support availability of the data center operations while minimizing downtime. In some instances, servers may be initially configured with hardware and software resources that are suited to particular computing tasks. However, due to maintenance, upgrades and repairs of malfunctioning components, the configuration of servers may be modified over time such that the specialized capabilities of a server may be compromised. In addition, due to the complexity of data center administration, manual configuration of updated and new components may result in misconfigured or sub-optimally configured components, further compromising the specialized server capabilities.

SUMMARY

In various embodiments, methods are provided for configuring components of a chassis comprising a plurality of IHSs (Information Handling Systems). The methods include: initializing, by a management controller of the chassis, a process for identifying a plurality of hardware and software capabilities of the chassis; determining a plurality of computing solutions supported using the plurality of hardware and software capabilities of the chassis; encoding the computing solutions determined to be supported by the hardware and software capabilities of the chassis; detecting updates to the hardware and software capabilities of the chassis; and detecting, based on the encoded computing solutions, when the updated hardware and software capabilities of the chassis are incompatible with any computing solution supported by the chassis.

In additional embodiments, the methods further include transmitting the encoded computing solutions supported by the chassis to a solution manager operable to monitor computing solutions supported by a plurality of chassis. In additional embodiments, the methods further include identifying, by the solution manager, one or more of the plurality of supported chassis that are compatible with a first computing solution. In additional method embodiments, the chassis is configured to support a first computing solution based on the hardware and software capabilities of the chassis. In additional embodiments, the methods further include detecting, based on the encoded computing solutions, when the updated hardware and software capabilities of the chassis are incompatible with the first computing solution. In additional embodiments, the methods further include determining, based on the encoded computing solutions, a second computing solution supported by the updated hardware and software capabilities of the chassis. In additional embodiments, the methods further include reporting the detected updates to the hardware and software capabilities of the chassis to a plurality of hardware components of the chassis that support a distributed hardware compatibility ledger. In additional method embodiments, a hardware compatibility ledger of a first hardware component specifies hardware components compatible with the first hardware component. In additional embodiments, the methods further include evaluating, by the first hardware component, the detected updates to the hardware and software capabilities against the hardware compatibility ledger; and signaling incompatibility of the first hardware component with the detected updates based on the evaluation.

In various additional embodiments, chassis management controller is configured as a component of a chassis comprising a plurality of IHSs (Information Handling Systems). The chassis management controller includes: one or more processors; and a memory device coupled to the one or more processors, the memory device storing computer-readable instructions that, upon execution by the one or more processors, cause the chassis management controller to: initialize a process for identifying a plurality of hardware and software capabilities of the chassis; determine a plurality of computing solutions supported using the plurality of hardware and software capabilities of the chassis; encode the computing solutions determined to be supported by the hardware and software capabilities of the chassis; detect updates to the hardware and software capabilities of the chassis; and detect, based on the encoded computing solutions, when the updated hardware and software capabilities of the chassis are incompatible with any computing solution supported by the chassis.

In additional chassis management controller embodiments, execution of the instructions further causes the chassis management controller to: transmit the encoded computing solutions supported by the chassis to a solution manager operable to monitor computing solutions supported by a plurality of chassis and to identify one or more of the plurality of supported chassis that are compatible with a first computing solution. In additional chassis management controller embodiments, the chassis is configured to support a first computing solution based on the hardware and software capabilities of the chassis. In additional chassis management controller embodiments, execution of the instructions further causes the chassis management controller to detect, based on the encoded computing solutions, when the updated hardware and software capabilities of the chassis are incompatible with the first computing solution. In additional chassis management controller embodiments, execution of the instructions further causes the chassis management controller to determine, based on the encoded computing solutions, a second computing solution supported by the updated hardware and software capabilities of the chassis. In additional chassis management controller embodiments, execution of the instructions further causes the chassis management controller to report the detected updates to the hardware and software capabilities of the chassis to a plurality of hardware components of the chassis that support a distributed hardware compatibility ledger used to evaluate compatibility of a respective hardware component with the detected updates.

In various additional embodiments, a memory device is coupled to one or more processors, the memory device storing computer-readable instructions that, upon execution by the one or more processors, cause the processors to: initialize a process for identifying a plurality of hardware and software capabilities of the chassis; determine a plurality of computing solutions supported using the plurality of hardware and software capabilities of the chassis; encode the computing solutions determined to be supported by the hardware and software capabilities of the chassis; detect updates to the hardware and software capabilities of the chassis; and detect, based on the encoded computing solutions, when the updated hardware and software capabilities of the chassis are incompatible with any computing solution supported by the chassis.

In additional memory device embodiments, execution of the instructions further causes the processors to: transmit the encoded computing solutions supported by the chassis to a solution manager operable to monitor computing solutions supported by a plurality of chassis and to identify one or more of the plurality of supported chassis that are compatible with a first computing solution. In additional memory device embodiments, the chassis is configured to support a first computing solution based on the hardware and software capabilities of the chassis. In additional memory device embodiments, execution of the instructions further causes the processors to detect, based on the encoded computing solutions, when the updated hardware and software capabilities of the chassis are incompatible with the first computing solution. In additional memory device embodiments, execution of the instructions further causes the processors to: determine, based on the encoded computing solutions, a second computing solution supported by the updated hardware and software capabilities of the chassis.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
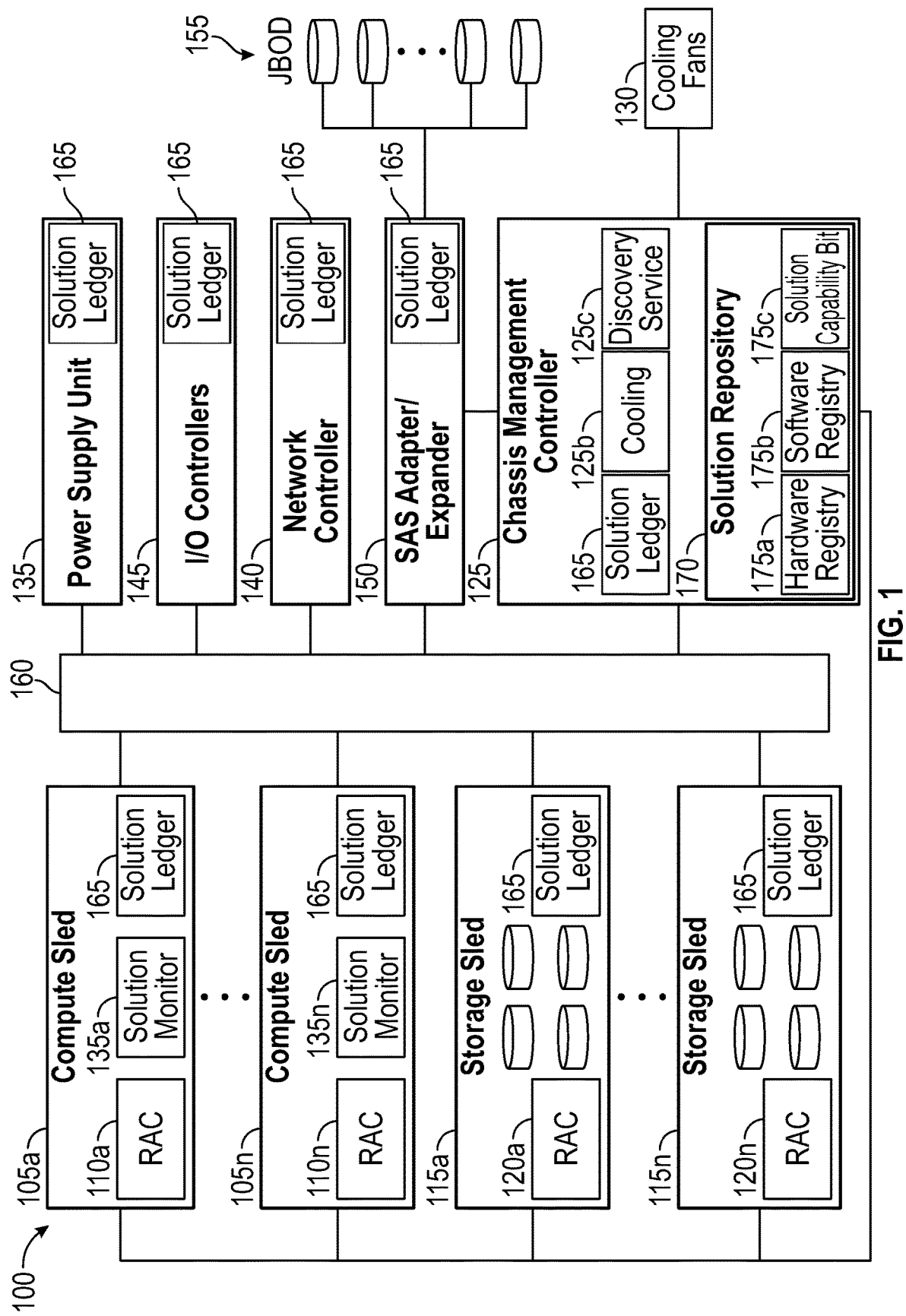
FIG. 1 is a block diagram illustrating certain components of a chassis, according to some embodiments, for monitoring and validating the configuration of servers for supporting specific computing solutions.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

By configuring a chassis 100 with different sleds, the chassis may be adapted to support specific types of operations, thus providing a computing solution directed towards a specific type of computational task. For instance, a chassis 100 that is configured to support artificial intelligence computing solutions may include additional compute sleds, compute sleds that include additional processors, and/or compute sleds that include specialized artificial intelligence processors or other specialized artificial intelligence components, such as specialized FPGAs. In another example, a chassis 100 configured to support specific data mining operations may include network controllers 140 that support high-speed couplings with other similarly configured chassis, thus supporting high-throughput, parallel-processing computing solutions. In another example, a chassis 100 configured to support certain database operations may be configured with specific types of storage sleds 115a-n that provide increased storage space or that utilize adaptations that support optimized performance for specific types of databases. In other scenarios, a chassis 100 may be configured to support specific enterprise applications, such as by utilizing compute sleds 105a-n and storage sleds 115a-n that include additional memory resources that support simultaneous use of enterprise applications by multiple remote users. In another example, a chassis 100 may include compute sleds 105a-n and storage sleds 115a-n that support secure and isolated execution spaces for specific types of virtualized environments.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. In some embodiments, components installed on a motherboard backplane 160 may include components that implement all or part of the functions described with regard to components such as the SAS (Serial Attached SCSI) expander 150, I/O controllers 145, network controller 140 and power supply unit 135.

Figure 2:
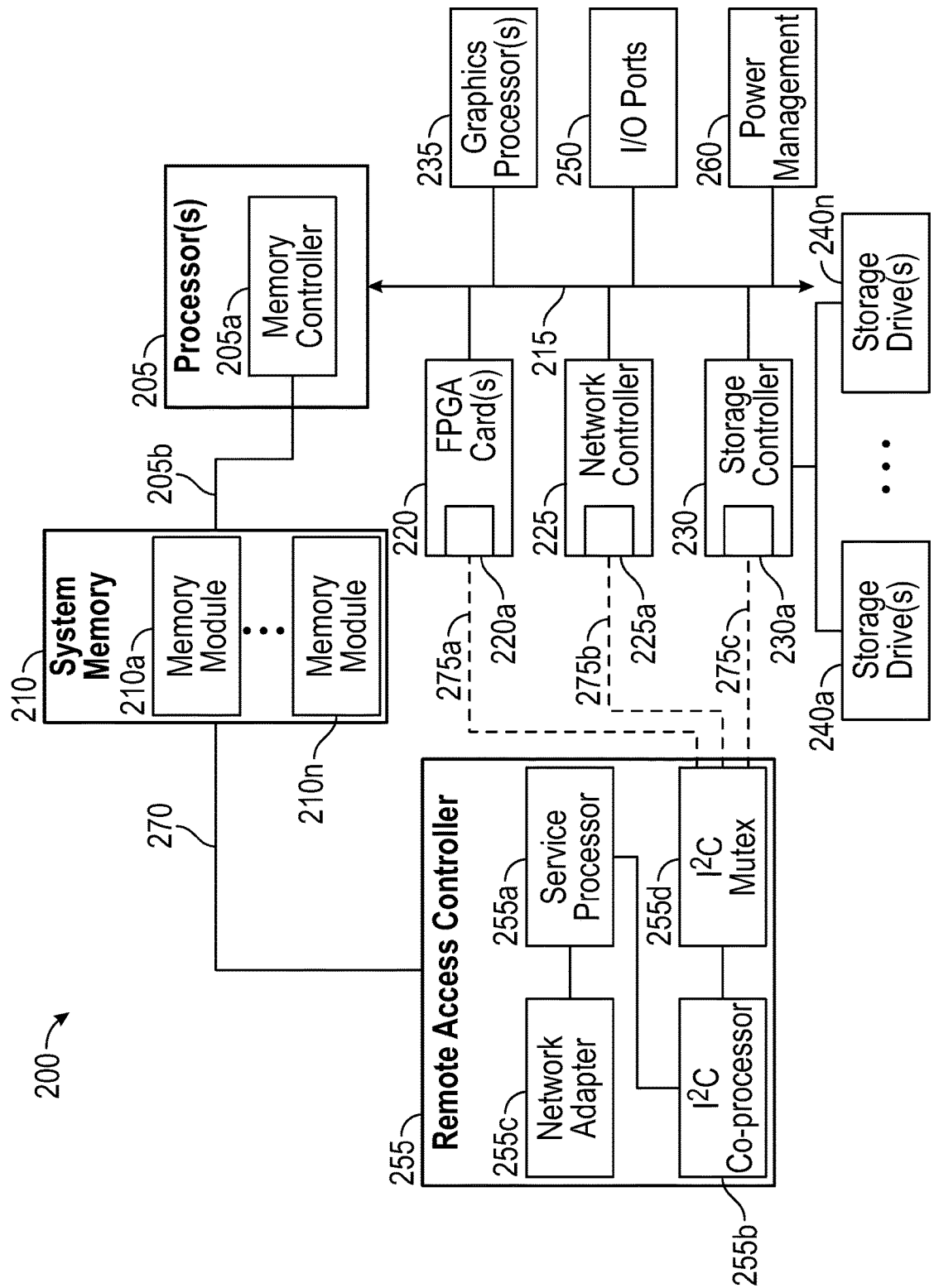
FIG. 2 is a block diagram illustrating certain components of an IHS configured as a component of a chassis, according to some embodiments, for monitoring and validating the configuration of servers for supporting specific computing solutions.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, in some cases as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks in support of specific computing solutions.

As illustrated, each compute sled 105a-n includes a remote access controller (RAC) 110a-n. As described in additional detail with regard to FIG. 2, a remote access controller 110a-n provides capabilities for remote monitoring and management of compute sled 105a-n. In support of these monitoring and management functions, remote access controllers 110a-n may utilize both in-band and sideband (i.e., out-of-band) communications with various internal components of a compute sled 105a-n and with other components of chassis 100. Remote access controller 110a-n may collect sensor data, such as temperature sensor readings, from components of the chassis 100 in support of airflow cooling of the chassis 100 and the sleds 105a-n, 115a-n. In some embodiments, remote access controllers 110a-n may support communications with chassis management controller 125 by reporting configuration information for use in evaluating and validating the configuration of removable components of the chassis 100 for supporting a particular computing solution.

A compute sled 105a-n may include one or more processors that support specialized computing operations, such as high-speed computing, artificial intelligence processing, database operations, parallel processing, graphics operations, streaming multimedia and/or isolated execution spaces for virtualized environments. Using such specialized processor capabilities of a compute sled 105a-n, a chassis 100 may be adapted for a particular computing solution. As indicated in FIG. 1, a compute sled 105a-n may also include a solution monitor 135a-n. As described in additional detail with regard to FIGS. 3-4, an individual solution monitor 135a may monitor the hardware and/or software capabilities of a compute sled 105a that are related to computing solutions that may be supported by the chassis 100. In addition, a solution monitor 135a may report any detected changes to the hardware and/or software capabilities of a compute sled 105a that are related to a supported computing solution. The settings and changes detected by the solution monitors 135a-n may be reported to the chassis management controller 125 for use in validating the configuration of chassis 100 for supporting specific computing solutions.

Figure 4:
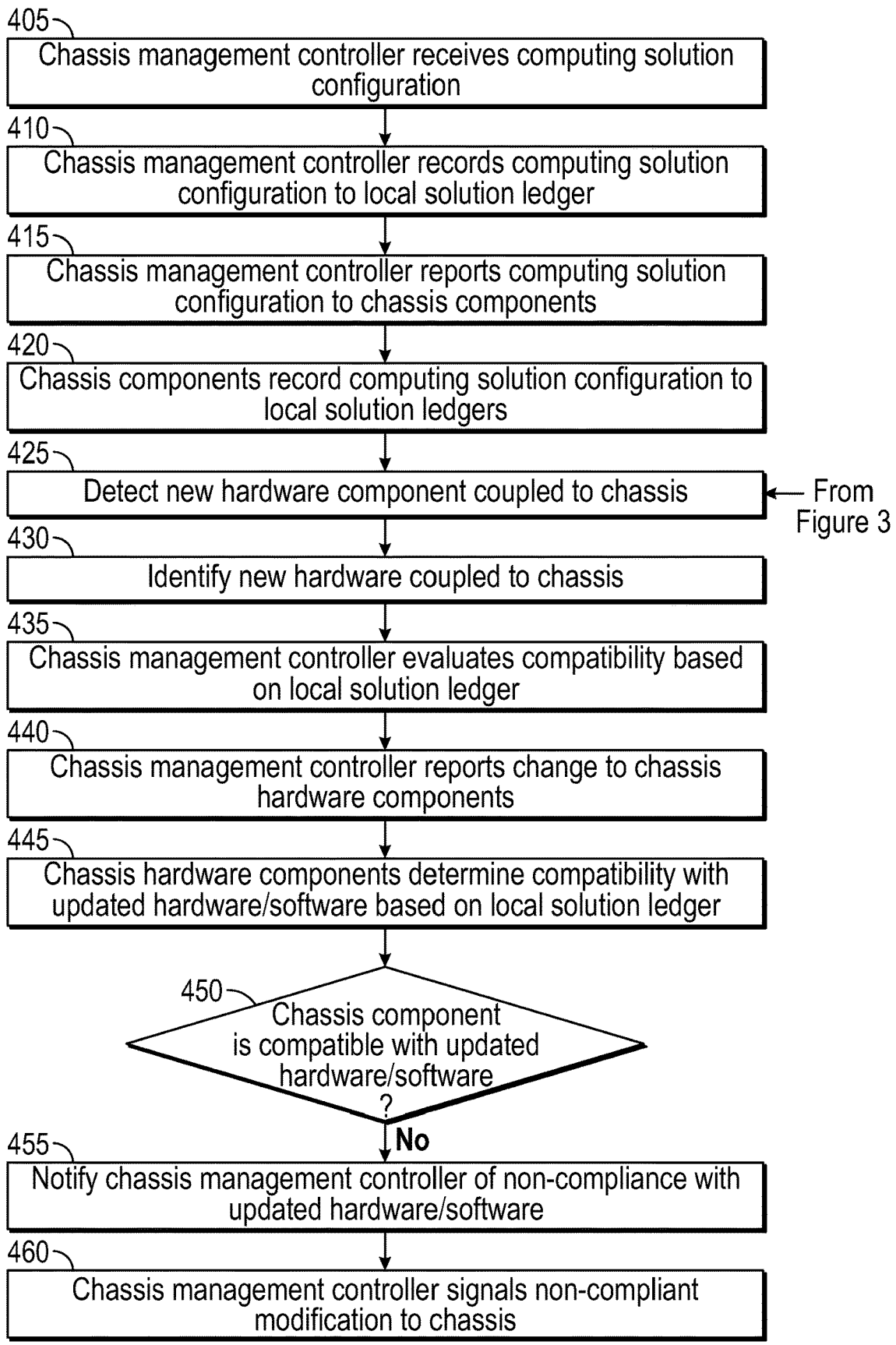
FIG. 4 is a flowchart diagram illustrating certain steps of a process, according to some embodiments, for monitoring and validating the configuration of servers for supporting specific computing solutions.

As described in additional detail with regard to FIG. 4, various replaceable hardware components of a chassis may support validation of compatibility with other replaceable hardware components of the chassis. In support of this capability, each such replaceable hardware component may maintain a local copy of a solution ledger 165 that specifies valid hardware and software configurations for one or more computing solutions supported by chassis 100. In some embodiments, the solution ledger 165 of a replaceable hardware component may be initially populated as part of the manufacture and initial provisioning of the component. The solution ledger 165 may be further augmented through administration of the replaceable hardware component. For instance, the solution ledger 165 of a compute sled 105a-n or storage sled 115a-n may be updated upon removal of sleds from chassis 100 as part of administration or re-purposing of the sleds. As described in with regard to FIG. 4, in some embodiments, solution ledger 135 may be updated via updates received by the chassis management controller, where the updates specify changes to the hardware and software capabilities that comprise a valid computing solution configuration.

In some embodiments, each compute sled 105a-n may include a storage controller that may be utilized to access storage drives that are accessible via chassis 100. Some of the individual storage controllers may provide support for RAID (Redundant Array of Independent Disks) configurations of logical and physical storage drives, such as storage drives provided by storage sleds 115a-n. In some embodiments, some or all of the individual storage controllers utilized by computer sleds 105a-n may be HBAs (Host Bus Adapters) that provide more limited capabilities in accessing physical storage drives provided via storage sleds 115a-n and/or via SAS expander 150.

As illustrated, chassis 100 also includes one or more storage sleds 115a-n that are coupled to the backplane 160 and installed within one or more bays of chassis 200 in a similar manner to compute sleds 105a-n. Each of the individual storage sleds 115a-n may include various different numbers and types of storage devices. For instance, storage sleds 115a-n may include SAS (Serial Attached SCSI) magnetic disk drives, SATA (Serial Advanced Technology Attachment) magnetic disk drives, solid-state drives (SSDs) and other types of storage drives in various combinations. The storage sleds 115a-n may be utilized in various storage configurations by the compute sleds 105a-n that are coupled to chassis 100. As illustrated, each storage sled 115*a-n* may include a remote access controller (RAC) 120*a-n*. Remote access controllers 120*a-n* may provide capabilities for remote monitoring and management of storage sleds 115*a-n* in a similar manner to the remote access controllers 110*a-n* included in compute sleds 105*a-n*. Like the compute sleds 105*a-n*, each storage sled 115*a-n* may also include a solution ledger 165 that specifies valid hardware and software configurations for one or more computing solutions supported by chassis 100.

In addition to the data storage capabilities provided by storage sleds 115*a-n*, chassis 100 may provide access to other storage resources that may be installed components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also be remotely located. In some embodiments, a SAS expander 155 may include a solution ledger 165 that specifies valid hardware and software configurations for one or more computing solutions supported by chassis 100.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. As illustrated, a replaceable network controller 140 may also include a solution ledger 165 that specifies valid hardware and software configurations for one or more computing solutions supported by chassis 100.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. A power supply 135 implemented as a removable sled may include a solution ledger 165 that specifies valid hardware and software configurations for one or more computing solutions supported by chassis 100. In such embodiments, the power supply 135 may include compatibility logic for evaluating detected changes to the hardware and software of chassis 100 against the valid computing solution configuration specified in solution ledger 165. As part of this evaluation, the compatibility logic of the power supply 135 determines its compatibility with the detected changes. For instance, a solution ledger 135 of a replaceable power supply 135 may be used to verify compatibility of the power supply 135 with particular chassis management controllers 125 that are identified in the solution ledger 165 and that support advanced power delivery options.

Chassis 100 may also include various I/O controllers 140 that may support various I/O ports, such as USB ports that may be used to support keyboard and mouse inputs and/or video display capabilities. Such I/O controllers 145 may be utilized by a chassis management controller 125 to support various KVM (Keyboard, Video and Mouse) capabilities that provide administrators with the ability to interface with the chassis 100. Each I/O controller 140 may include a solution ledger 165 that specifies valid hardware and software configurations for one or more computing solutions supported by chassis 100.

In addition to providing support for KVM capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

As described, components of chassis 100 such as compute sleds 105*a-n* may include solution monitoring 165*a-n* capabilities that report configurations and changes related to computing solutions. Chassis management controller 125 may similarly include a solution monitor that tracks computing solution configuration settings for some chassis components. As described, power supply unit 135 and network controller 140 may be replaceable components that may be configured in support of computing solutions. The solution monitor of the chassis management controller 125 may query such components for settings related to computing solutions and may detect any changes to these replaceable components that may affect support for computing solutions.

As illustrated, the chassis management controller 125 may include a solution repository 170 that stores computing solution configuration information for components of the chassis 100. For instance, chassis management controller 125 may record configuration information received from solution monitors 135*a-n* of the chassis 100 in the solution repository 170. In some embodiments, the solution repository 170 may include a hardware register 175*a* used for tracking the replaceable hardware components currently installed within chassis 100, as well as valid hardware settings for these replaceable components, such as supported firmware versions, BIOS settings and boot settings for each of the replaceable components. As replaceable hardware components are identified and their settings are collected, the chassis management controller augments the hardware registry to include these settings as valid hardware configurations for each type of replaceable component. In some embodiments, computing solution configurations may also be received by the chassis management controller 125 from an administrative source, where the received configurations specify valid computing solution configurations (i.e., computing solution blueprints) that identify hardware components and component configurations that may comprise a computing solution. As described in additional detail with regard to FIGS. 3-4, in some embodiments this blueprint information may be maintained in a distributed solution ledger 165 that may be used by the chassis management controller 125 and other hardware components of the chassis 100 in order to verify compatibility with detected changes to the hardware and software capabilities of the chassis 100.

Received blueprints may include a preferred configuration for a computing solution as well as alternative configurations supported by a computing solution. For instance, a blueprint may specify a preferred components for use in implementing a particular computing solution, such as a preference for use of a compute sled that includes a specialized artificial intelligence processor, as well as alternative components, such as compute sleds that include processors that operate as speeds above a specified threshold and include specific types and amounts of memory. In another example, a blueprint may specify a preferred network controller 140 model, but may also specify other alternate models that may instead be used in valid computing solution configurations.

In some embodiments, the solution repository 170 may also include a solution registry 175b used for recording settings for configuring the replaceable hardware components of chassis 100 in support of one or more computing solutions. For instance, the solution registry 175b may include settings for configuring specific enterprise applications, such as databases or other business software, supported by a computing solution. The solution registry 175b may also include settings for configuring virtual interfaces that are formed from logically combining multiple replaceable components, such as logical combinations of storage sleds 115a-n that present a single storage interface or logical combinations of network controllers 140 that present a single network interface. The solution registry 175b may also include settings for configuring the operating systems of compute nodes 105a-n for participation in a computing solution, such as installing artificial intelligence, e-commerce, database or other computing packages for use in support of a computing solution. Such operating system configurations included in the solution registry 175b may include settings for utilizing virtual interfaces formed from logical combinations of replaceable hardware components of the chassis.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105a-n, that is configured to share infrastructure resources provided by a chassis 100 in support of specific computing solutions.

The IHS 200 of FIG. 2 may be a compute sled, such as compute sleds 105a-n of FIG. 1, that may be installed within a chassis, that may in turn be installed within a rack. Accordingly, IHS 200 may be comprised within a large system of similarly configured IHSs that may be housed within the same chassis, rack and/or datacenter. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one, some or all of processor(s) 205 may be graphics processing units (GPUs). In some embodiments, one, some or all processor(s) 205 may be specialized processors, such as artificial intelligence processors or processor adapted to support high-throughput parallel processing computations. As described, such specialized adaptations of IHS 200 may be used to implement specific computing solutions support by the chassis in which IHS 200 is installed.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components. In certain embodiments, the I/O ports 250 may provide couplings to the backplane of the chassis in which the IHS 200 is installed.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200. In certain embodiments, such specialized functions supported by an FPGA card 220 may be utilized by IHS 200 in support of certain computing solutions. In such embodiments, the instructions used to program FPGA 220 may be reported to the chassis management controller along with other settings of IHS 200 that are used to implement supported computing solutions.

IHS 200 may also support one or more storage controllers 230 that may be utilized to provide access to virtual storage configurations. For instance, storage controller 230 may provide support for RAID (Redundant Array of Independent Disks) configurations of storage devices 240a-n, such as storage drives provided by storage sleds 115a-n and/or JBOD 155 of FIG. 1. In some embodiments, storage controller 230 may be an HBA (Host Bus Adapter).

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In some embodiments, BIOS instructions may be reported to the chassis management controller along with other settings of IHS 200 that are used to implement supported computing solutions. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely. In some embodiments, instructions used to configure remote access controller 255 may be reported to the chassis management controller along with other settings of IHS 200 that are used to implement supported computing solutions.

In some embodiments, remote access controller 255 may support monitoring and administration of various devices 220, 225, 230 of an IHS via a sideband interface. In such embodiments, the messages in support of the monitoring and management function may be implemented using MCTP (Management Component Transport Protocol) that may be transmitted using I2C sideband bus connection 275a-c established with each of the respective managed devices 220, 225, 230. As illustrated, the managed hardware components of the IHS 200, such as FPGA cards 220, network controller 225 and storage controller 230, are coupled to the IHS processor(s) 205 via an in-line bus 215, such as a PCIe root complex, that is separate from the I2C sideband bus connection 275a-c.

In certain embodiments, the service processor 255a of remote access controller 255 may rely on an I2C co-processor 255b to implement sideband I2C communications between the remote access controller 255 and managed components 220, 225, 230 of the IHS. The I2C co-processor 255b may be a specialized co-processor or micro-controller that is configured to interface via a sideband I2C bus interface with the managed hardware components 220, 225, 230 of IHS. In some embodiments, the I2C co-processor 255b may be an integrated component of the service processor 255a, such as a peripheral system-on-chip feature that may be provided by the service processor 255a. Each I2C bus 275a-c is illustrated as single line in FIG. 2. However, each I2C bus 275a-c may be comprised of a clock line and data line that couple the remote access controller 255 to I2C endpoints 220a, 225a, 230a.

As illustrated, the I2C co-processor 255b may interface with the individual managed devices 220, 225 and 230 via individual sideband I2C buses 275a-c selected through the operation of an I2C multiplexer 255d. Via switching operations by the I2C multiplexer 255d, a sideband bus connection 275*a*-*c* may be established by a direct coupling between the I2C co-processor 255*b* and an individual managed device 220, 225 or 230.

In providing sideband management capabilities, the I2C co-processor 255*b* may each interoperate with corresponding endpoint I2C controllers 220*a*, 225*a*, 230*a* that implement the I2C communications of the respective managed devices 220, 225, 230. The endpoint I2C controllers 220*a*, 225*a*, 230*a* may be implemented as a dedicated microcontroller for communicating sideband I2C messages with the remote access controller 255, or endpoint I2C controllers 220*a*, 225*a*, 230*a* may be integrated SoC functions of a processor of the respective managed device endpoints 220, 225, 230.

As described, a compute node such as IHS 200 may include a solution monitor that collects and monitors settings of the IHS 200 that relate to supported computing solutions. In some embodiments, a solution monitor may be implemented as a process of remote access controller 255, where the solution configuration information from IHS 200 components 220, 225, 230 may be collected by service processor 255*a* via the out-of-band management connections 275*a*-*c* supported by I2C co-processor 255*b*. The collected configuration information may then be reported to the chassis management controller via a connection supported by the network adapter 255*c* of the remote access controller 255.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
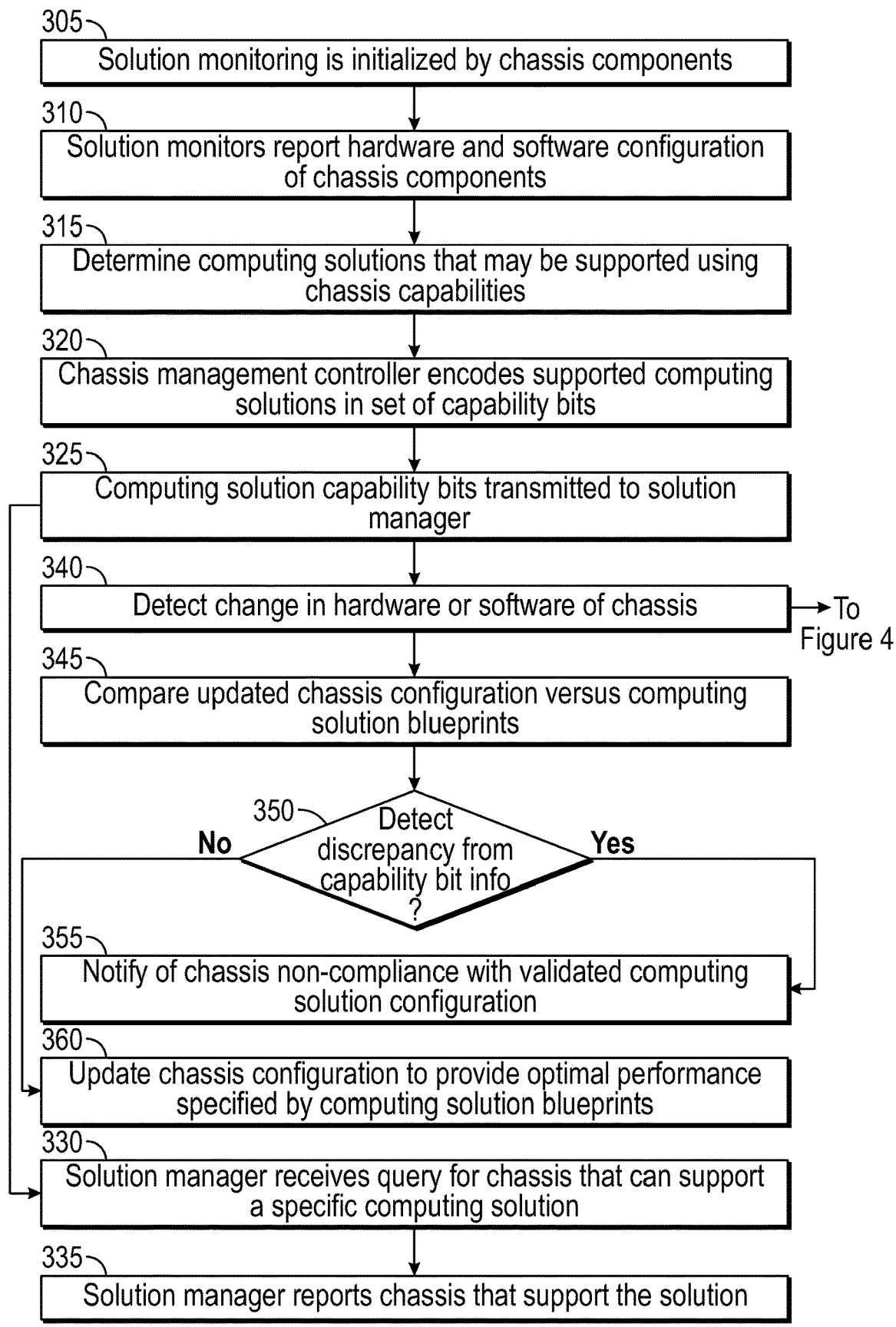
FIG. 3 is a flowchart diagram illustrating certain steps of a process, according to some embodiments, for monitoring and validating the configuration of servers for supporting specific computing solutions.

FIG. 3 is a flowchart diagram illustrating certain steps of a process, according to some embodiments, for monitoring and validating the configuration of servers for supporting specific computing solutions supported by a chassis, such as chassis 100 and the hardware components of chassis 100 described with regard to FIG. 1. The illustrated embodiment begins, at 305, with the initialization of one or more solution monitor processes that are operated by hardware components of the chassis. As described, a chassis may include one or more compute sleds that may each utilize one or more separately instantiated operating systems. In some embodiments, the operating system(s) of each compute sled may include a solution monitoring process. In some embodiments, the solution monitor process may instead be implemented external to the operating system of a compute sled and may be a process operated by a remote access controller of a compute sled. As described with regard to FIG. 1, a chassis management controller may also include a solution monitor process that collects configuration information for certain replaceable chassis components.

At block 310, the various solution monitors that are operated by chassis components report the collected hardware and software configuration information to the chassis management controller. As described, some configuration information may be collected directly by the chassis management controller. Based on the collected and reported configuration information, at block 315 the chassis management controller determines computing solutions that may be supported using the available capabilities of the chassis. As described with regard to FIG. 1, the chassis management controller may be provided with computing solution blueprints that specify the hardware components and configuration settings that may be used to support specific computing solutions. Blueprints may specify preferred hardware components for a computing solution, such as a preferred network controller or a preferred artificial intelligence computing sled, as well as alternate valid components. Blueprints may similarly specify preferred configuration settings, as well as alternate configuration settings for the chassis hardware. Blueprints may also specify software configurations for these hardware components, such as enterprise applications and databases that are utilized by a computing solution. Based on such blueprints, the chassis management controller may determine all valid computing solutions that may be supported using the hardware and software capabilities of a chassis.

Once the valid computing solutions for a chassis are identified, the chassis management controller may encode these supported computing solutions in a set of capability bits maintained by the chassis management controller. In some embodiments, each of the capability bits maintained by the chassis management controller may encode a determination regarding whether the chassis capabilities support a particular computing solution. Using the capability bits, the chassis management controller may provide an immediate response to queries seeking to determine whether the chassis supports a particular computing solution. The capability bits maintained by the chassis controller may also be used to report all computing solutions that may be supported by a chassis.

As indicated in block 325 of FIG. 3, in some embodiments, the set of capability bits maintained by the chassis management controller may be transmitted to a solution manager. In some embodiments, the solution manager may be a central management tool used to administer multiple chassis that are located within one or more datacenters. The solution manager may be a management tool that includes a user interface and may be a component of a management console used by datacenter administrators. As described, datacenter administrators may be tasked with supporting a large number of chassis within a datacenter. As replaceable components of these chassis are replaced and other administrative tasks are performed, the capabilities of the individual chassis may gradually shift from their original configurations. For instance, computing sleds and storage sleds may be repurposed and moved between different chassis. Other replaceable sleds, such as network adapters and power supplies, may be replaced with sleds that have upgraded capabilities.

Due to the large number of chassis that may be supported by multiple administrators working in shifts, an administrator is not readily able to identify a chassis within the data center that has the capabilities to support a particular computing solution. Addressing this difficulty, at block 330, the solution manager may receive queries from an administrator for the identity of chassis that may be used to support a particular computing solution. For instance, an administrator tasked with configuring a chassis that implements an particular artificial intelligence computing solution may generate a query to the solution manager for all chassis that are configurable to support this computing solution. The solution manager may quickly identify all such chassis based on the reported compatibility bits received from each of the chassis management controllers of the supported chassis. Using the reported compatibility bits, the solution manager immediately identifies chassis that can support a particular computing solution without having to query each of the individual chassis. Based on the compatibility bit information, at block 335, the solution manager reports the chassis that may be configured to support the computing solution of interest to the administrator.

As described, the chassis management controller may receive reports from solution monitors in response to detected changes in the capabilities of the chassis. For instance, a solution monitor of a compute sled may report a configuration change that disables an enterprise computing application or a database that is required for supporting a computing solution. A solution monitor of a storage sled may report a configuration change to a storage controller that alters the availability of an array of storage drives (e.g., JBOD) accessed via a SAS adapter. The solution monitoring capabilities of the chassis management controller may detect a decoupling of a sled, such as a compute sled, storage sled or network adapter sled, thus altering the capabilities of the chassis to support computing solutions. At block 340, any such change to the hardware or software capabilities of a chassis are detected. As described in FIG. 4, in scenarios where a new component is detected, that change may be reported to the components of the chassis for determining compatibility with the new chassis component.

At block 345, the detected changes in the configuration of the chassis are compared against the computing solution blueprints maintained by the chassis management controller. As described, the computing solution blueprints specify valid computing solution configurations. Based on comparisons of the updated chassis configuration versus valid computing solution blueprints, at block 350 a discrepancy may be detected from the compatibility bits maintained by the chassis management controller. If no discrepancy is detected and the updated configuration corresponds to a supported computing solution, at block 360, the solution blueprint is consulted in order to determine whether improved performance of the computing solution may be achieved through further configuration. For instance, a change to the chassis components may indicate that a new network controller sled has been coupled to the chassis. The computing solution blueprints may indicate that the new network controller is supported by the current computing solution and may also specify additional supported configurations for the network controller. In such scenarios, a configuration providing the best performance in support of the current computing solution may be selected and used to update the configuration of the new network controller. If the updated chassis configuration does not correspond to a valid computing solution blueprint, at block 355, the chassis management controller may signal a noncompliant configuration of the chassis.

FIG. 4 is a flowchart diagram illustrating certain steps of a process, according to some embodiments, for monitoring and validating the configuration of servers for supporting specific computing solutions. As described with regard to FIG. 3, changes to the hardware and software capabilities may be detected by solution monitors that may operate on various components of the chassis, including the chassis management controller. In some instances, such changes include the coupling of new hardware components to the chassis, such as the replaceable hardware components described with regard to FIG. 1. In some embodiments, the individual replaceable hardware components of a chassis may be configured to validate their own compatibility with new hardware components coupled to the chassis.

Such embodiments may begin, at block 405, with the receipt of computing solution configurations by the chassis management controller. As described, the chassis management controller may receive computing solution blueprints that specify all valid hardware and software configurations that may be used to support a specific computing solution. In addition, the chassis management controller may receive discrete updates to such computing solution blueprints, where the updates specify changes to a computing solution blueprint, such as support for a new type of compute sled. At block 410, the chassis management controller records computing solution configuration information to a local solution ledger. As described with regard to FIG. 1, various components of a chassis may maintain copies of a distributed ledger (i.e., blockchain) that is used to record valid computing solution configurations. Accordingly, upon receipt of a computing solution blueprint, an update to a blueprint or any other form of computing solution configuration information, the chassis management controller records the configuration information to its solution ledger. At block 415, the chassis management controller proceeds to distribute the configuration information to the chassis components that also maintain copies of solution ledger. At block 420, the individual chassis components record the configuration information to their local copies of the solution ledger.

As described with regard to FIG. 3, at block 425, changes in the hardware and software capabilities of the chassis are detected and reported by solution monitors. In some instances, the change includes the addition of a new hardware component to the chassis. Various types of components of a chassis may be replaceable. However, computing solutions may be supported only for specific sets of validated chassis components. Any variations from validated computing solution configuration may result in degraded performance, inoperability, lack of compliance with warranty requirements, etc. In many instances, different types of replaceable components are provided by different manufacturers and/or sellers. Consequently, tracking cross-compliance between individual chassis components is a difficult task for datacenter administrators. Accordingly, the embodiment of FIG. 4 supports each replaceable component verifying compatibility with other components of a chassis. Valid computing solution configurations are provided to all participating components via the described distributed solution ledger.

Upon identification of a new hardware component coupled to the chassis, at block 430, the chassis management controller may proceed, at block 435, to evaluate its own compatibility with the new hardware component. The chassis management controller may utilize compatibility logic that evaluates whether it is compliant with the new hardware component in light of the validity of the new component, as determined based on the valid computing solution configurates provided within the solution ledger transactions. The compatibility logic may be provided during trusted manufacture of the replaceable components, or as part of a trusted administration of the replaceable components. In some embodiments, the compatibility logic of individual replaceable components may be periodically updated via trusted remote administration procedures, such as supported by the remote access controllers described with regard to FIG. 1. In some embodiments, updates to the compatibility logic may be provided via transactions to the distributed solution ledger. In such embodiments, the chassis management controller and/or a remote access controller may receive distributed solution ledger transactions that encode updated compatibility logic for a replaceable chassis component. The confidentiality of compatibility logic may be maintained through encryption of the compatibility logic using cryptographic protocols that may be deciphered only by selected replaceable hardware components.

A chassis management controller may utilize compatibility logic that is supported by the datacenter administrators. The administrators may utilize the compatibility logic to specify compatibility of the chassis management controller with various types of replaceable chassis components, but may rely on the replaceable hardware components themselves to verify their compatibility with each other. Using its compatibility logic, at block 435, the chassis management controller determines its compatibility with the new hardware. The chassis management controller may evaluate the validity of and further identify the capabilities of a new hardware component based on the computing solution configuration information encoded within the transactions of the solution ledger.

Based on the available information, the computing logic may determine whether a new hardware component has been validated for a current computing solution, or whether it can nonetheless be supported in scenarios where compliance cannot be positively determined. Different degrees of flexibility may be provided by administrators supporting replaceable hardware components. A chassis management controller or secure compute sled may provide compute logic requiring strict requirements with certain replaceable components and little support for backwards compatibility, whereas a storage sled may support significant flexibility in operating with other components and significant backwards compatibility.

At block 440, the chassis management controller reports the new hardware component to each of the participating replaceable components. At block 445, each of the participating hardware components evaluates their compatibility with the new hardware using their particular compatibility logic and the computing solution configuration information encoded within the distributed ledger. As described, each replaceable hardware component may utilize computing logic updates provided as solution ledger transaction. Using any updated computing logic, at block 450, the chassis components determine whether they are compatible with the new hardware component. If an incompatibility is determined by a participating component, at block 455, the chassis management controller is notified of the non-compliance. The notification may include a description of the incompatibility. At block 460, the chassis management controller may issue an administrative alert or notification indicating the reported lack of compliance resulting from the hardware change. Appropriate administrators may be provided with the alerts or notifications, allowing administrators of the datacenter or of the replaceable components to address the issue.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for configuring a plurality of replaceable IHSs (Information Handling Systems) installed in a chassis, the method comprising:
   collecting, by a solution monitor process operated by a management controller of the chassis, an inventory of hardware and software capabilities reported by the replaceable IHSs installed in the chassis, wherein the management controller manages sharing of resources of the chassis by the plurality of replaceable IHSs;
   determining a plurality of computing solutions supported by the chassis using the inventory of hardware and software capabilities reported by the replaceable IHSs installed in the chassis;
   encoding the computing solutions determined to be supported by the chassis, wherein the supported computing solutions are encoded within a plurality of capability bits that are maintained by the management controller of the chassis;
   detecting updates to the hardware and software capabilities of the replaceable IHSs installed in the chassis; and
   determining, based on the computing solutions encoded within the capability bits maintained by the management controller of the chassis, when the updated hardware and software capabilities reported by the replaceable IHSs installed in the chassis are incompatible with a computing solution supported by the chassis.

2. The method of claim 1, further comprising:
   transmitting the capability bits encoding the computing solutions supported by the chassis to a remote solution manager operable to monitor computing solutions supported by a plurality of chassis.

3. The method of claim 2, further comprising:
   identifying, by the solution manager based on the capability bits, one or more of the plurality of chassis that are compatible with a first computing solution.

4. The method of claim 1, wherein the chassis is configured to support a first computing solution based on the hardware and software capabilities reported by the replaceable IHSs installed in the chassis.

5. The method of claim 4, further comprising:
detecting, based on the computing solutions encoded in the capability bits maintained by the chassis management controller, when the updated hardware and software capabilities of the chassis are incompatible with the first computing solution.

6. The method of claim 5, further comprising:
determining, based on the computing solutions encoded in the capability bits maintained by the chassis management controller, a second computing solution supported by the updated hardware and software capabilities of the chassis.

7. The method of claim 1, further comprising:
reporting the detected updates to the hardware and software capabilities of the chassis to a plurality of hardware components of the chassis that support a distributed hardware compatibility ledger.

8. The method of claim 7, wherein a hardware compatibility ledger of a first hardware component specifies hardware components compatible with the first hardware component.

9. The method of claim 8, further comprising:
evaluating, by the first hardware component, the detected updates to the hardware and software capabilities against the hardware compatibility ledger; and
signaling incompatibility of the first hardware component with the detected updates based on the evaluation.

10. A chassis management controller configured as a component of a chassis comprising a plurality of replaceable IHSs (Information Handling Systems) installed in the chassis, wherein the chassis management controller manages sharing of resources of the chassis by the plurality of replaceable IHSs, the chassis management controller comprising:
one or more processors; and
a memory device coupled to the one or more processors, the memory device storing computer-readable instructions that, upon execution by the one or more processors, cause the chassis management controller to:
identify a plurality of hardware and software capabilities reported by the replaceable IHSs installed in the chassis;
determine a plurality of computing solutions supported by the chassis using the plurality of hardware and software capabilities reported by the replaceable IHSs installed in the chassis;
encode the computing solutions determined to be supported by the chassis, wherein the supported computing solutions are encoded within a plurality of capability bits that are maintained by the management controller of the chassis;
detect updates to the hardware and software capabilities of the replaceable IHSs installed in the chassis; and
determine, based on the computing solutions encoded in the capability bits maintained by the chassis management controller, when the updated hardware and software capabilities reported by the replaceable IHSs installed in the chassis are incompatible with a computing solution supported by the chassis.

11. The chassis management controller of claim 10, wherein execution of the instructions further causes the chassis management controller to:
transmit the capability bits encoding the computing solutions supported by the chassis to a remote solution manager operable to monitor computing solutions supported by a plurality of chassis and to identify one or more of the plurality of supported chassis that are compatible with a first computing solution.

12. The chassis management controller of claim 10, wherein the chassis is configured to support a first computing solution based on the hardware and software capabilities reported by the replaceable IHSs installed in the chassis.

13. The chassis management controller of claim 12, wherein execution of the instructions further causes the chassis management controller to:
detect, based on the computing solutions encoded in the capability bits maintained by the chassis management controller, when the updated hardware and software capabilities of the chassis are incompatible with the first computing solution.

14. The chassis management controller of claim 13, wherein execution of the instructions further causes the chassis management controller to:
determine, based on the computing solutions encoded in the capability bits maintained by the chassis management controller, a second computing solution supported by the updated hardware and software capabilities of the chassis.

15. The chassis management controller of claim 10, wherein execution of the instructions further causes the chassis management controller to:
report the detected updates to the hardware and software capabilities of the chassis to a plurality of hardware components of the chassis that support a distributed hardware compatibility ledger used to evaluate compatibility of a respective hardware component with the detected updates.

16. A memory device coupled to one or more processors of a chassis management controller that manages sharing of resources of a chassis by a plurality of replaceable IHSs installed in the chassis, the memory device storing computer-readable instructions that, upon execution by the one or more processors, cause the processors to:
identify a plurality of hardware and software capabilities reported by the replaceable IHSs installed in the chassis;
determine a plurality of computing solutions supported by the chassis using the plurality of hardware and software capabilities reported by the replaceable IHSs installed in the chassis;
encode the computing solutions determined to be supported by the chassis, wherein the supported computing solutions are encoded within a plurality of capability bits that are maintained by the management controller of the chassis;
detect updates to the hardware and software capabilities of the replaceable IHSs installed in the chassis; and
determine, based on the computing solutions encoded in the capability bits maintained by the chassis management controller, when the updated hardware and software capabilities reported by the replaceable IHSs installed in the chassis are incompatible with a computing solution supported by the chassis.

17. The memory device of claim 16, wherein execution of the instructions further causes the processors to:
transmit the capability bits encoding the computing solutions supported by the chassis to a remote solution manager operable to monitor computing solutions supported by a plurality of chassis and to identify one or more of the plurality of supported chassis that are compatible with a first computing solution.

18. The memory device of claim 16, wherein the chassis is configured to support a first computing solution based on the hardware and software capabilities reported by the replaceable IHSs installed in the chassis.

19. The memory device of claim 18, wherein execution of the instructions further causes the processors to:
   detect, based on the encoded computing solutions encoded in the capability bits maintained by the chassis management controller, when the updated hardware and software capabilities of the chassis are incompatible with the first computing solution.

20. The memory device of claim 19, wherein execution of the instructions further causes the processors to:
   determine, based on the computing solutions encoded in the capability bits maintained by the chassis management controller, a second computing solution supported by the updated hardware and software capabilities of the chassis.

\* \* \* \* \*